United States Patent

[11] 3,631,341

| [72] | Inventor | Keiichi Kazuno<br>Ohmiya, Japan |
|---|---|---|
| [21] | Appl. No. | 73,997 |
| [22] | Filed | Sept. 21, 1970 |
| [45] | Patented | Dec. 28, 1971 |
| [73] | Assignees | Nissan Motor Company, Limited<br>Yokohama;<br>Kanto Seiki Company, Limited<br>Ohmiya, Japan |
| [32] | Priority | June 19, 1970 |
| [33] | | Japan |
| [31] | | 45/53291 |

[54] BIMETAL THERMAL GAUGE HAVING ZERO AND FULL SCALE CALIBRATION MEANS
6 Claims, 4 Drawing Figs.

[52] U.S. Cl. ..................................... 324/106, 324/74
[51] Int. Cl. ..................................... G01r 5/26, G01r 1/38
[50] Field of Search ............................ 324/106, 74, 130

[56] References Cited
UNITED STATES PATENTS

| 2,520,897 | 8/1950 | Smulski | 324/106 |
| 2,991,418 | 7/1961 | Kraft | 324/106 |

*Primary Examiner*—Rudolph V. Rolinec
*Assistant Examiner*—Ernest F. Karlsen
*Attorney*—John Lezdey ABSTRACT: A bimetal thermal gauge having a U-shaped bimetal strip which is deformed when heated and a pointer which is rotatable about a stationary shaft and which is positioned relative to a graduated scale, the pointer being calibrated for alignment with respect to upper and lower limit lines of the scale by moving the bimetal strip in two directions. The alignments with respect to the lower and upper limits can be achieved independently from each other.

BIMETAL THERMAL GAUGE HAVING ZERO AND FULL SCALE CALIBRATION MEANS

This invention relates to a bimetal thermal gauge for use, typically, with a fuel gauge, engine temperature gauge or fluid pressure gauge mounted in a motor vehicle. The invention relates, more particularly, to a bimetal thermal gauge of the type which is disclosed in U.S. Pat. No. 2,991,418 to Edmond William Kraft.

In the drawings:

FIG. 1 is a front view showing essential parts of the thermal gauge shown in the aforesaid U.S. Pat. No. 2,991,418;

Figure 1:
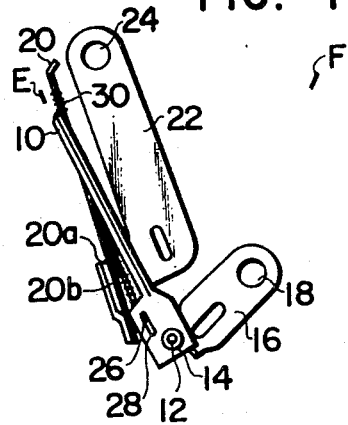

The bimetal thermal gauge which is disclosed in U.S. Pat. No. 2,991,418 has, as illustrated in FIG. 1, a pointer 10 which is mounted for rotation on a shaft or pin 12 through a bracket 14. The shaft or pin 12, in turn, is secured to a bracket 16 which is rotatable about a shaft 18. A bifurcated or generally U-shaped bimetal strip 20 having an upper operating leg 20a and a lower temperature-compensating leg 20b is securely mounted at its leading end on a bracket 22 through the lower compensating leg 20b. The bracket 22 is rotatable about a shaft 24. A pin 26 is fixedly mounted to an end of the upper operating leg 20a and is inserted into an elongated slot 28 which is formed in the bracket 14, so that a displacement of the operating leg 20b of the bimetal strip 20 is followed by the pointer 10 on an enlarged scale. Such displacement of the operating leg 20b is caused by a winding 30 which is wound on the operating leg 20b and which is heated to heat the leg 20b when energized.

In calibrating the bimetal thermal gauge so as to have the pointer 10 aligned with the upper and lower limit lines F and E, respectively, of the graduations on a scale plate (not shown), the winding 30 is firstly energized for indicating, for example, an empty tank condition corresponding to the lower limit line E of the scale plate and concurrently the bracket 22 is rotated about the shaft 24 until the pointer 10 is aligned with the lower limit line E. The winding 30 is secondly energized in accordance with the opposite limit line F, which may indicate a full tank condition, to which the pointer 10 should move and, at the same time, the bracket 16 is rotated about the shaft 18 until the pointer 10 is brought into alignment with the limit line F. In this instance, an arrangement is made so that the first alignment of the pointer 10 in respect of the lower limit line E may not be affected by the subsequent alignment relative to the upper limit line F because the elongated slot 28 in the bracket 14 is oriented to be substantially perpendicular to a line connecting the centers of the shafts 12 and 18.

A drawback is encountered in the calibration of the thermal gauge in that, because the shaft or pin 12 is liable to move in the direction of the pointer 10 as the bracket 16 is rotated about the shaft 18, the pointer 10 tends to be moved forward or backward relative to the graduations on the scale plate. The result is that the graduations may be either concealed underneath the pointer 10 or spaced too apart from the tip of the pointer 10, anyway making it rather difficult for an observer to accurately read the graduation registered. This problem is serious especially where the thermal gauge is of edgewise instrument type in which an L-shaped pointer is used in combination with a curved dial plate. If, in this instance, the bent tip portion of the L-shaped pointer is positioned so closely as to be in contact with the curved scale plate, then the pointer is prevented from moving freely so that the gauge itself does not operate.

An object of the invention is, therefore, to provide an improved bimetal thermal gauge of the type which is free from the aforesaid drawback and in which the alignments of the pointer relative to the upper and lower limits of the graduations can be made completely independently from each other.

Figure 2:
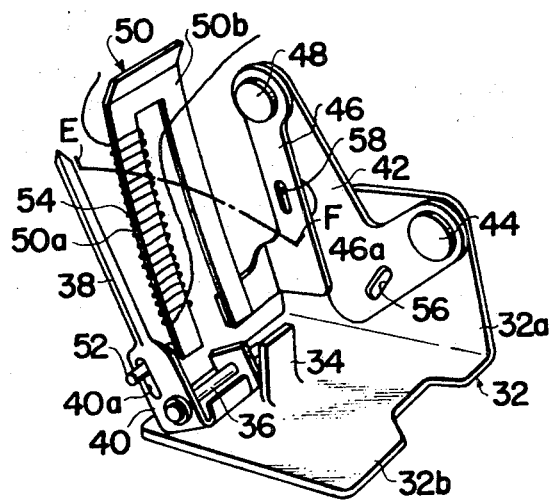
FIG. 2 is a perspective view of a preferred embodiment of a bimetal thermal gauge according to the invention, wherein the gauge is shown with the scale plate removed for clarity of illustration.
Figure 3:
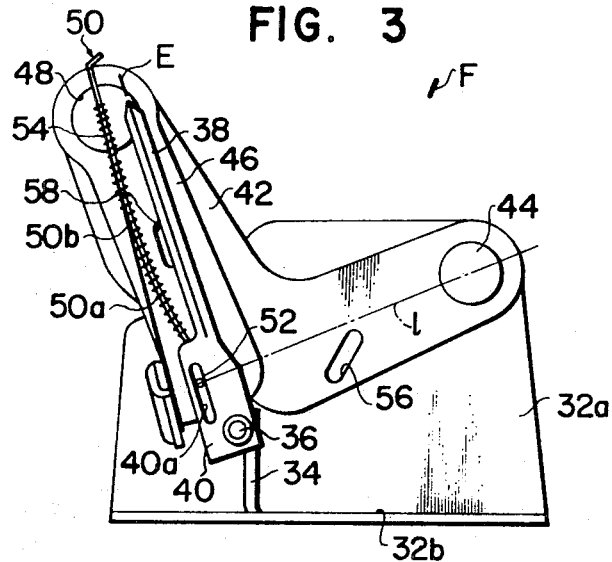
FIG. 3 is a front view showing the essential parts of the bimetal thermal gauge shown in FIG. 2.

A first embodiment of the invention to accomplish such an object is now illustrated in FIGS. 2 and 3.

Referring, therefore, to FIGS. 2 and 3, the bimetal thermal gauge according to the invention includes a frame structure 32 consisting of a base member 32a and a support member 32b which is bent at a substantially right angle to the base member 32a. The base member 32a and support member 32b may be either integral or two members which are secured to each other. An extension 34 is formed on the support member 32b, the extension being usually normal to the inner surface of the support member. The extension 34 may be formed either as a member securely attached to the support member 32b or in such a manner that a section, or tongue, is cut in the support member 32b and is bent to be normal to the plane of the support member 32b as illustrated.

A pointer shaft 36 is secured, by means of welding for instance, to the thus formed extension 34. A pointer 38 is rotatably mounted on the shaft 36 through a pointer bracket 40 which has formed therein a slot 40a which is elongated substantially in line with the pointer 38. The pointer is moved, or rotated, during operation on a plane substantially parallel to the base member 32a of the frame structure 32.

A substantially bifurcated or generally V-shaped first calibrating bracket 42 is connected at one end to the base member 32a through a pivot or stud 44 about which the bracket 42 is rotatable. The first calibrating bracket 42 is connected at the other end to a second calibrating bracket 46 through a pivot or stud 48 about which the second calibrating bracket 46 is rotatable on the first calibrating bracket 42.

A substantially U-shaped bimetal strip 50 having an operating leg 50a and a temperature compensating leg 50b is connected at a leading end of the compensating leg 50b to the end portion of the second calibrating bracket 46 through an extension 46a of the bracket. The operating leg 50a of the bimetal strip 50 is connected at its leading end to a pin 52 extending outwardly of the leg 50a. The pin 52 is movably inserted into the elongated slot 40a in the bracket 40 of the pointer 38 so that the pointer follows a displacement of the operating leg 50a through the pin 52 on an enlarged scale. It is preferable that the pin 52 may be as remote as possible from the studs 44 and 48.

The operating leg 50a of the bimetal strip 50 has wound thereon a heater winding 54, which is connected to a suitable electric circuit having a variable resistor or other device which is responsive to the conditions on an object, such as the fuel level, engine temperature or fluid pressure of a motor vehicle, to be monitored by the bimetal thermal gauge.

Designated by reference numerals 56 and 58 are apertures which are formed in the brackets 42 and 46, respectively, and into which a special tool is inserted for rotating the brackets when in calibration of the gauge. The reference characters E and F designate the lower and upper limit lines of the graduations borne on a scale plate (not shown) which forms part of the thermal gauge. Where the bimetal thermal gauge is used as a fuel gauge, for instance, then the lower limit line E will correspond to the point zero indicating an empty tank condition and the upper limit line F to the full scale point indicating a full tank condition.

The first calibrating bracket 42 carried by the base member 32a is so arranged that the bimetal strip 50 and the pin 52 secured to the operating leg 50a thereof are moved, together with the second calibrating bracket 46, in the substantially lengthwise direction of the bimetal strip 50 as the first calibrating bracket 42 is rotated about the stud 44. The second calibrating bracket 46, on the other hand, is arranged in such a manner that, when the bracket 46 is rotated about the stud 48, then the bimetal strip 50 and the pin 52 secured thereto are moved in a direction substantially perpendicular to the lengthwise direction of the elongated slot 40a in the pointer bracket 40. The slot 40a in the pointer bracket 40, furthermore, is elongated in a direction substantially perpendicular to a line connecting the centers of the stud 44 and the pin 52 when the pointer 38 is positioned in alignment with the lower limit line E of the scale plate, as clearly seen in FIG. 3 in which such line is indicated as a phantom line *l*. It is, in this instance, highly preferable that a line connecting the centers of the pin 52 and the stud 48 about which the second calibrating bracket 46 is to be rotated be substantially perpendicular to the line *l* connecting the pin 52 and the stud 44 about which the first calibrating bracket 42 is to be rotated.

In calibrating the pointer 38 in relation to the lower and upper limit lines E and F, respectively, upon completion of the assembly of the bimetal thermal gauge which is constructed and arranged in a manner described, the winding 54 wound on the operating leg 50a of the bimetal strip 50 is first energized with a current corresponding to the lower limit line E of the scale. With the winding 54 kept energized in this condition, the second calibrating bracket 46 is rotated about the stud 48 by the use of a suitable tool which is inserted into the aperture 58, until the pointer 38 is held in line with the lower limit line E. The winding 54 is then energized with a current corresponding to the upper limit line F of the scale. In so doing, the first calibrating bracket 42 is rotated about the stud 44 by the use of the tool inserted into the aperture 56 until the pointer 38 is calibrated for alignment with the upper limit line E.

In the calibration of the pointer 38 in respect of the lower limit line E of the scale, the pointer 38 can be accurately aligned with the line E because, as previously discussed, the pin 52 secured to the bimetal strip 50 is moved in a direction substantially perpendicular to the lengthwise direction of the elongated slot 40a. In the calibration of the pointer 38 the pointer can be aligned with the line F accurately and without affecting the relative position of the pointer which has been calibrated with respect to the lower limit line E, because the bimetal strip 50 and the second calibrating bracket 46 attached thereto are moved substantially in the lengthwise direction of the bimetal strip and because the slot 40a in the pointer bracket 40 is elongated in a direction in which, when the pointer 38 is aligned with the lower limit line E, the line connecting the centers of the stud 48 and the pin 52 is substantially perpendicular to the line connecting the centers of the stud 44 and the pin 52, as previously noted.

It is sometimes required to meet the desired design characteristics of the thermal gauge that the lengthwise direction of the operating leg 50a of the bimetal strip 50 be deviated at a certain angle from the lengthwise direction of the elongated slot 40a when the pointer 38 indicates the lower line E. In this instance, the lines connecting the pin 52 to the studs 44 and 48 should not be substantially perpendicular to each other but the lengthwise direction of the elongated slot 40a should be substantially perpendicular to the line connecting the centers of the stud 44 and the pin 52.

It will be understood that the pointer 38 of the thermal gauge shown in FIGS. 2 and 3 can be satisfactorily calibrated in respect of both of the lower and upper limit lines of the scale with the pointer per se held stationary on the frame structure 32. A modified form of the thermal gauge providing this advantage is illustrated in FIG. 4.

Figure 4:
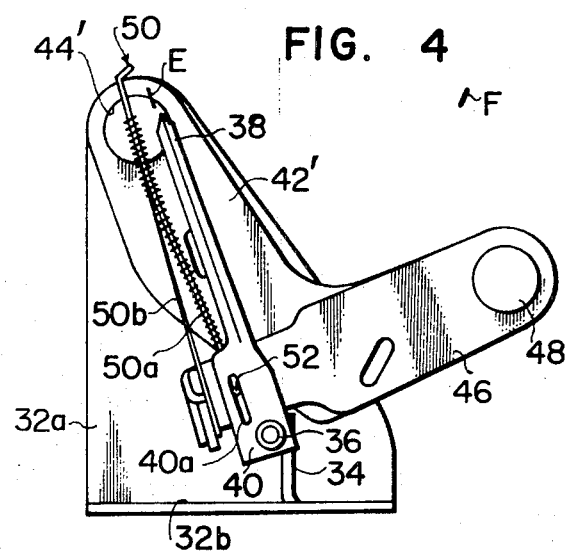
FIG. 4 is a front view of a second preferred embodiment of a bimetal thermal gauge according to the invention, the scale plate also being removed.

Referring to FIG. 4, the thermal gauge illustrated therein is built with those parts and elements which are essentially equivalent to those appearing in FIGS. 2 and 3 and such essentially equivalent counterparts are denoted by like reference numerals. Different from the embodiment of FIGS. 2 and 3, a substantially bifurcated or generally V-shaped first calibrating bracket 42' is rotatably connected at one leading end to the base member 32a through a stud 44'. A second calibrating bracket 46' is rotatably connected at one end to the other leading end of the first calibrating bracket 42' through a stud 48' and secured at the other to the compensating leg 50b of the bimetal strip 50 which consequently is permitted to move in a direction substantially perpendicular to the lengthwise direction of the elongated slot 40a in the pointer bracket 40.

In this modified form of the bimetal thermal gauge according to the invention, the slot 40a formed in the pointer bracket 40 is elongated in a direction substantially perpendicular to a line connecting the centers of the pin 52 and the stud 48' of the second calibrating bracket 46' when the pointer 38 indicates the lower limit line E. It is preferable, as is the case with the first embodiment of the invention, the lines connecting the center of the pin 52 to the centers of the studs 44' and 48' be substantially perpendicular to each other so that the pointer 38 can be calibrated accurately, namely, the calibrations with respect to the lower and upper limit lines E and F, respectively, can be accomplished substantially independently from each other.

It will now be appreciated from the foregoing description that, since the pointer of the bimetal thermal gauge according to the invention is held stationary on the frame structure, an undue displacement of the pointer as would otherwise take place in the course of calibration of the pointer can be eliminated with simple but beneficial improvements incorporated into the gauge. The thermal gauge implementing the invention will, therefore, prove advantageous especially where it is used as an edgewise instrument in which the position of the L-shaped pointer relative to the curved scale plate is critical to the performance of the gauge.

What is claimed is:

1. A bimetal thermal gauge comprising a frame structure, a pointer shaft secured to said frame structure, a pointer rotatably mounted on said pointer shaft through a pointer bracket, said bracket having formed therein a longitudinally elongated slot, a first calibrating bracket rotatably mounted at one end portion on said frame structure through a first pivot, a second calibrating bracket rotatably connected at one end to the other end portion of said first calibrating bracket through a second pivot, a generally U-shaped bimetal strip having an operating leg and a temperature-compensating leg, said temperature-compensating leg being rigidly connected at one end portion to the other end portion of said second calibrating bracket, a pin rigidly connected to the leading end of said operating leg and movably inserted into said slot, a winding which is wound on said operating leg and connected to an electric circuit having a variable resistor which is responsive to varying conditions of an object to be measured, and a scale plate bearing graduations having lower and upper limit lines and positioned relative to said pointer, said bimetal strip and said pin being moved in the substantially lengthwise direction of said bimetal strip for alignment of said pointer with respect to said upper limit line by rotating said first calibrating bracket and in a direction substantially perpendicular to said slot for alignment of said pointer with respect to said lower limit line by rotating said second calibrating bracket.

2. A bimetal thermal gauge according to claim 1, wherein said slot in said pointer bracket is elongated in the direction substantially perpendicular to a line connecting the centers of said pin and said first pivot when said pointer is positioned in alignment with said lower limit line.

3. A bimetal thermal gauge according to claim 1, wherein said slot in said pointer bracket is elongated in the direction substantially perpendicular to a line connecting the centers of said pin and said second pivot when said pointer is positioned in alignment with said lower limit line.

4. A bimetal thermal gauge according to claim 1, wherein lines connecting the center of said pin to the centers of said first and second pivots are substantially perpendicular to each other.

5. A method of calibrating the bimetal thermal gauge according to claim 1, comprising energizing said winding by a current corresponding to said lower limit line, rotating said second calibrating bracket about said second pivot until said pointer is brought into alignment with said lower limit line, further energizing said winding with a current corresponding to said upper limit line, and rotating said first calibrating bracket about said first pivot until said pointer is brought into alignment with said upper limit line.

6. A method of calibrating the bimetal thermal gauge according to claim 1, comprising energizing said winding with a current corresponding to said upper limit line, rotating said first calibrating bracket about said first pivot until said pointer is brought into alignment with said lower limit line, further energizing said winding with a current corresponding to said lower limit line, rotating said second calibrating bracket about said second pivot until said pointer is brought into alignment with said upper limit line.

* * * * *